United States Patent
Liu et al.

(10) Patent No.: US 11,096,132 B2
(45) Date of Patent: Aug. 17, 2021

(54) JOINT SOUNDING FOR MULTI-USER COMMUNICATION IN MULTI-AP WLAN

(71) Applicant: MEDIATEK SINGAPORE PTE. LTD., Solaris (SG)

(72) Inventors: Jianhan Liu, San Jose, CA (US); Shengquan Hu, San Jose, CA (US); Thomas Edward Pare, Jr., San Jose, CA (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 103 days.

(21) Appl. No.: 16/455,287

(22) Filed: Jun. 27, 2019

(65) Prior Publication Data
US 2020/0037275 A1    Jan. 30, 2020

Related U.S. Application Data

(60) Provisional application No. 62/703,477, filed on Jul. 26, 2018.

(51) Int. Cl.
| | | |
|---|---|---|
| H04W 56/00 | (2009.01) | |
| H04L 5/00 | (2006.01) | |
| H04W 72/04 | (2009.01) | |
| H04W 84/12 | (2009.01) | |
| H04W 88/08 | (2009.01) | |

(52) U.S. Cl.
CPC ......... *H04W 56/001* (2013.01); *H04L 5/0048* (2013.01); *H04W 72/0453* (2013.01); *H04W 84/12* (2013.01); *H04W 88/08* (2013.01)

(58) Field of Classification Search
CPC .......... H04W 56/001; H04W 72/0453; H04W 84/12; H04W 88/08; H04L 5/0048
USPC ....................................................... 370/350
See application file for complete search history.

(56) References Cited

U.S. PATENT DOCUMENTS

| | | | |
|---|---|---|---|
| 2014/0056204 A1* | 2/2014 | Suh ..................... | H04L 25/0228 370/312 |
| 2015/0110046 A1* | 4/2015 | Merlin ................. | H04B 7/0626 370/329 |
| 2016/0080122 A1* | 3/2016 | Oh ........................ | H04L 5/0007 370/330 |
| 2017/0295558 A1* | 10/2017 | Amizur ................. | G01S 1/0428 |
| 2019/0045366 A1* | 2/2019 | Vermani .............. | H04B 7/0617 |
| 2019/0081664 A1* | 3/2019 | Vermani .............. | H04B 7/0456 |

* cited by examiner

*Primary Examiner* — Sai Ming Chan

(57) ABSTRACT

A joint sounding mechanism used in a multi-AP system to gain channel information for joint data transmission. Multiple sounding APs can transmit a joint sounding packet that includes training symbols for the antennas of all the sounding APs with regard to the transmission channel. The antennas of the multiple sounding APs may be treated as a virtual antenna array with global antenna indexes. The joint sounding packet may include a plurality of training fields, each field corresponding to a respective antenna in the virtual antenna array. Alternatively, the joint sounding packet has subcarrier-interleaved training fields, where each sounding AP transmits training symbols on an allocated set of non-pilot subcarriers. Channel status information (CSI) can be generated by the STAs in response to the joint sounding packet and supplied to the APs. Accordingly, the APs can perform antenna beamforming and transmit a data packet jointly on the transmission channel.

21 Claims, 12 Drawing Sheets

JOINT SOUNDING FOR MULTI-USER COMMUNICATION IN MULTI-AP WLAN

CROSS REFERENCE TO RELATED APPLICATION

This patent application claims priority and benefit of the U.S. Provisional Patent Application No. 62/703,477, entitled "JOINT SOUNDING SCHEMES AND MULTI-USER COMMUNICATION SCHEMES FOR MULTI-AP SYSTEMS," filed on Jul. 26, 2018, the entire content of which is herein incorporated by reference for all purposes.

TECHNICAL FIELD

Embodiments of the present disclosure relate generally to the field of wireless network communication, and more specifically, to the field of multi-user multi-AP WIFI communication mechanisms.

BACKGROUND OF THE INVENTION

Using multiple access points (APs) in a wireless local area network (WLAN) has become increasingly popular in dense deployment environments. Multi-AP systems, also known as "mesh WIFI" systems, are well accepted in the market for better coverage, easy deployment and high throughput.

In current multi-AP communication systems, a plurality of APs are mainly used as relay nodes to expand radio coverage and increase throughput. The APs typically transmit and receive on different frequency channels to avoid interference. Therefore, transmissions between each AP and its associated STAs are independent of other APs; and transmissions between the APs are also independent. When an STA switches to use another AP, it has to switch to use another frequency channel, which requires a significant amount of overhead information exchange before data transmission even starts.

SUMMARY OF THE INVENTION

To further increase transmission efficiency and throughput and to enhance network performance, it is desirable to use multiple access points (APs) to simultaneously and jointly transmit (or receive) a data packet to (or from) multiple stations (STAs). The APs may operate on the same frequency channel in a joint data transmission and share bandwidth. To achieve this, for example for a downlink transmission, the APs need to know the channel status information (CSI) of the channels between the STAs and themselves. In wireless systems, CSI is obtained by a transmitter via sounding and feedback mechanisms. More specifically, a sounding packet is sent by the transmitter. The receiver estimates the CSI based on reception of the sounding packet, and feeds back the estimated CSI to the transmitter. The feedback can be compressed to reduce the feedback overhead.

Embodiments of the present disclosure are directed to an efficient sounding mechanism that can be used in a multi-AP wireless communication system and can allow the APs to obtain channel information from the associated STAs with minimal overhead information transmission.

Embodiments of the present disclosure include, in a wireless local area network (WLAN), multiple APs configured to simultaneously transmit to multiple STAs a joint sounding packet with regard to a wireless channel. The joint sounding packet combines training symbols for the antennas of multiple APs. The training symbols may be included in the long training fields (LTFs) of the packet, e.g., each LTF corresponding to a respective antenna of an AP. Upon receiving the joint sounding packet and based on the training symbols, the STAs concurrently estimate the CSI related to all the antennas specified in the packet. The CSI information is then supplied to the APs. Accordingly, the APs can perform beamforming on the antennas and then transmit a data packet jointly. In some embodiments, the multiple APs are coordinated by a coordinating AP in the same network for joint data transmission, where the coordinating AP may be a separate AP unit or one of the sounding APs.

In some embodiments, the antennas in the multiple sounding APs are virtually treated as a single antenna array, with each antenna assigned with a different global antenna index. Training fields for all the antennas in the virtual array are stacked in the joint sounding packet, e.g., each training field is associated with a global antenna index. Each sounding AP sends the training fields regarding its own antennas as a subset of the virtual antenna array. In some embodiments, each non-pilot subcarrier of the joint stacked training fields is encoded by a matrix P and transmitted by each sounding AP. That is, all the sounding APs transmit training symbols on every non-pilot subcarrier. The number of training fields in the sounding packet is greater than or equal to the number of antennas in the virtual antenna array. With the global indexing and joint stacked packet, each sounded STA can estimated the channels between all the sounding APs and itself.

In some other embodiments, the antennas of each AP are indexed locally. The total number of training fields in a joint sounding packet is equal to or greater than the maximum number of antennas in an individual AP among the sounding APs. Non-pilot subcarriers of each training field are allocated to the sounding APs such that each non-pilot subcarrier is only associated to one AP. Each sounding AP transmits training symbols on an allocated set of non-pilot subcarriers in a training field. Thus the joint sounding packet includes subcarrier interleaved training fields. The channels for each sub-carrier may be encoded by a P matrix.

According to embodiments of the present disclosure, a single joint sounding packet includes the training symbols used for CIS estimation for all the sounding APs, and thus allows the multiple APs to acquire sounding feedback from the STAs through a synchronized sounding packet transmission. Compared with transmitting multiple sounding packets sequentially by the multiple APs, transmitting a joint sounding packet can advantageously spare multiple null data packets that would be needed to initiate the transmissions of multiple sounding packets. Using a joint sounding packet also significantly reduces the header transmission time, which further contributes to reduced overhead or null data packet transmission. As a result, the network performance, efficiency and throughput can be improved.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying figures, in which like reference characters designate like elements.

DETAILED DESCRIPTION

Figure 1:
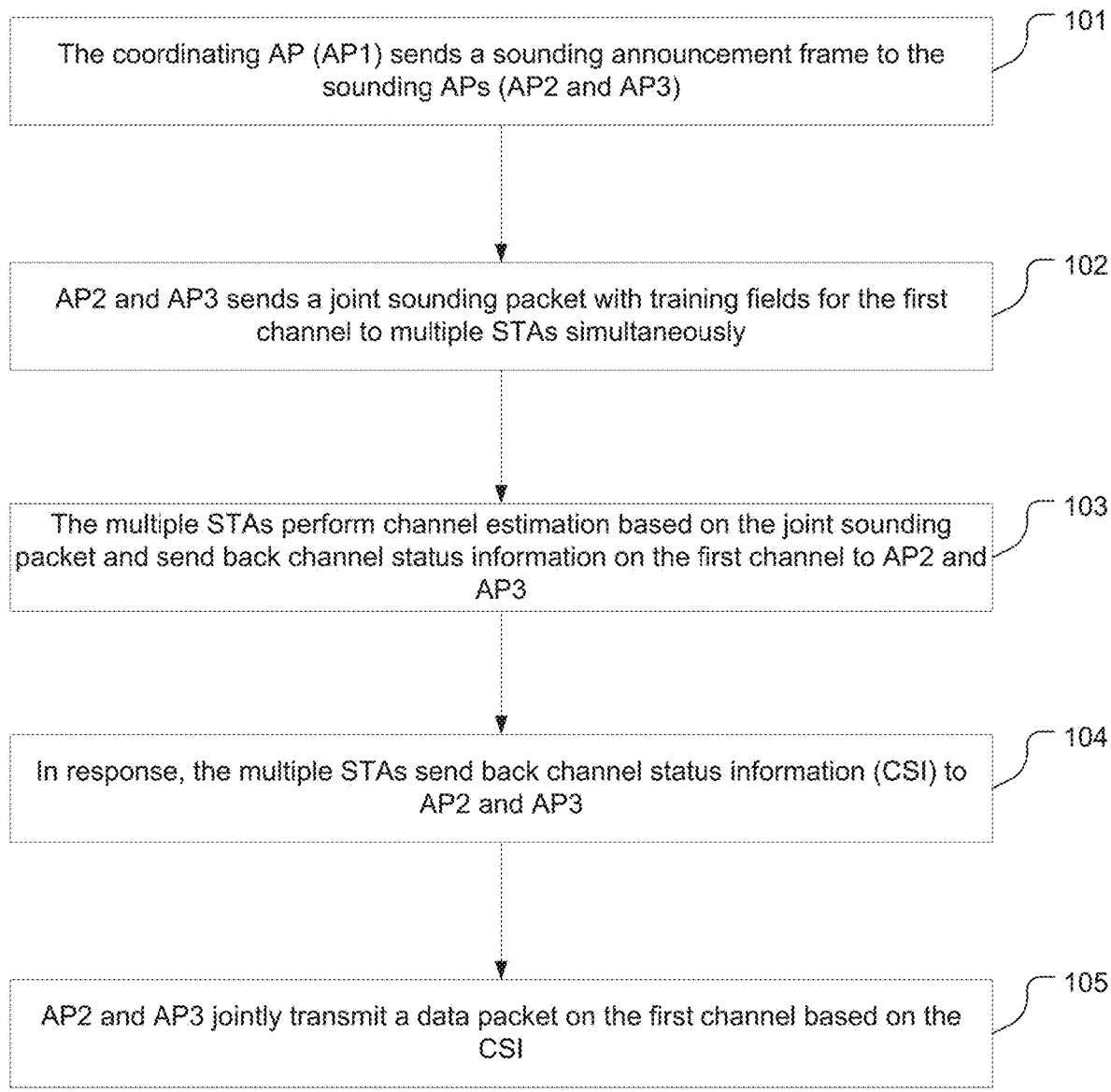
FIG. 1 is a flow chart depicting an exemplary multi-AP communication process related to a joint data transmission among multiple APs to multiple STAs in accordance with an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the Figures. Similarly, although the views in the drawings for the ease of description generally show similar orientations, this depiction in the Figures is arbitrary for the most part. Generally, the invention can be operated in any orientation.

Joint Sounding for Multi-User Communication in Multi-AP WLAN

Embodiments of the present disclosure are described in detail with reference to the formats and structures of Physical Layer Convergence Protocol (PLCP) protocol data unit (PPDUs), data frames, control frames and management frames as defined in the high efficiency (HE) wireless local area (WLAN)-based IEEE 802.11 family of Specifications and Standards. However, the present disclosure is not limited to any specific transmission formats or structures, nor limited to any specific industry standards or specifications.

Herein, joint data transmission refers to multiple APs transmitting in one transmission opportunity (TXOP) in synchronization on the same channel, e.g., transmitting a data packet jointly transmitting to multiple STAs.

Embodiments of the present disclosure provide a sounding mechanism that enables efficient multi-AP sounding with regard to a transmission channel. Multiple sounding APs can transmit a joint sounding packet that includes training symbols for the antennas of all the sounding APs with regard to the transmission channel. The antennas of the multiple sounding APs may be treated as a virtual antenna array with global antenna indexes. The joint sounding packet may include a plurality of training fields, each field corresponding to a respective antenna in the virtual antenna array. Alternatively, the joint sounding packet has subcarrier-interleaved training fields, where each sounding AP transmits training symbols on an allocated set of non-pilot subcarriers. Channel status information (CSI) can be generated by the STAs in response to the joint sounding packet and supplied to the APs. Accordingly, the APs can perform antenna beamforming and transmit a data packet jointly on the transmission channel.

Figure 2:
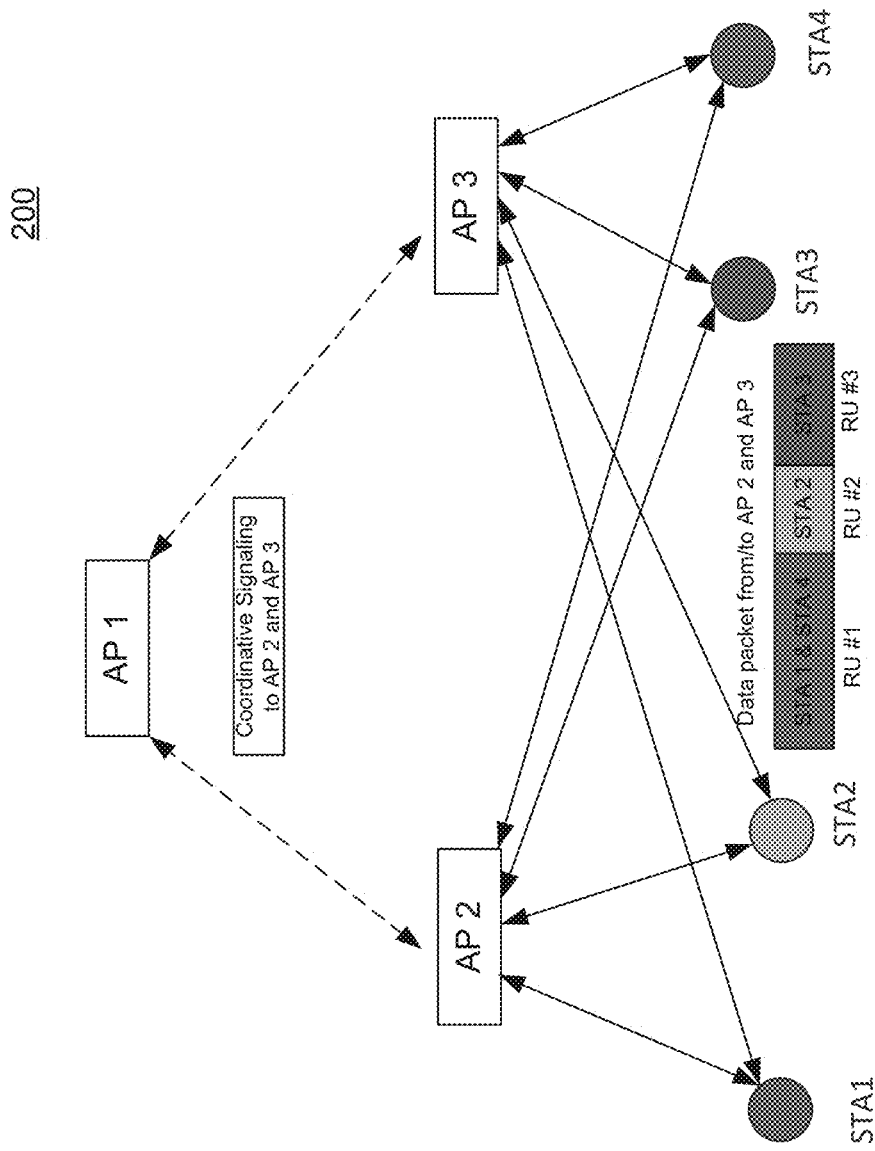
FIG. 2 illustrates an exemplary multi-AP WLAN capable of joint data transmission by multiple APs in accordance with an embodiment of the present disclosure.

FIG. 1 is a flow chart depicting an exemplary multi-AP communication process 100 related to a joint data transmission among multiple APs to multiple STAs in accordance with an embodiment of the present disclosure. FIG. 2 illustrates an exemplary multi-AP WLAN 200 capable of joint data transmission by multiple APs in accordance with an embodiment of the present disclosure. For example, process 100 in FIG. 1 may be performed by the WLAN 200 in FIG. 2.

In the embodiments described in detail herein, a separate AP is configured as a coordinating AP that can coordinate joint data transmission and joint sounding among a group of coordinated APs. However, it will be appreciated that the present disclosure is not limited thereto. One of the group of APs that perform joint data transmission and joint sounding can be configured as a coordinating AP for the group.

Referring to FIG. 2, the WLAN 200 includes a coordinating AP (AP1) operable to coordinate joint data transmission and joint sounding of the two coordinated APs, AP2 and AP3. STA1~STA4 are communicatively coupled to AP2 and AP3. Data and control information can be exchanged between the coordinated APs and the STAs. AP1 can send a coordinating signal to AP2 and AP3 to initiate joint transmission. The present disclosure is not limited to any specific form of the coordinating signal. AP2 and AP3 can transmit a data packet to, or receive one from, multiple STAs using Orthogonal Frequency Division Multiple Access (OFDMA), or multi-user (MU) multiple input, multiple output (MIMO).

In the illustrated example, in data transmission, STA2 and STA3 operate on different resource units (RUs), RU #2 and RU #3; and STA1 and STA4 operate on the same RU (RU #1). Each RU may be used in a multi-user manner in multiple spatial streams. For AP2 and AP3 to each communicate with the 4 STAs, each AP needs to know the CSI between the AP and all the STAs.

Referring to FIG. 1, to initiate a joint data transmission, the coordinating AP (AP1) sends a sounding announcement frame to inform the sounding APs (AP2 and AP3) at 101. The sounding announcement frame is used to gain control of the channel and identify the receive APs and/or STAs. AP1 may also send a sounding trigger frame to initiate multi-AP sounding for a first channel. A sounding synchronization indication may be included in the sound announcement frame or the sounding trigger frame. At 102, the sounding APs simultaneously send a joint sounding packet to multiple STAs, where the packet includes training signals for the AP antennas that will participate in the subsequent joint data transmission. At 103, the STAs receiving the joint sounding packet perform channel estimation respectively, and, at 104, send back estimated channel status information on the first channel to the sounding APs. At 105, AP2 and AP3 perform beamforming on the antennas based on the CSI feedback and jointly transmit a data packet on the first channel. The present disclosure is not limited by the mechanism of joint data transmission among multiple APs.

Figure 3:
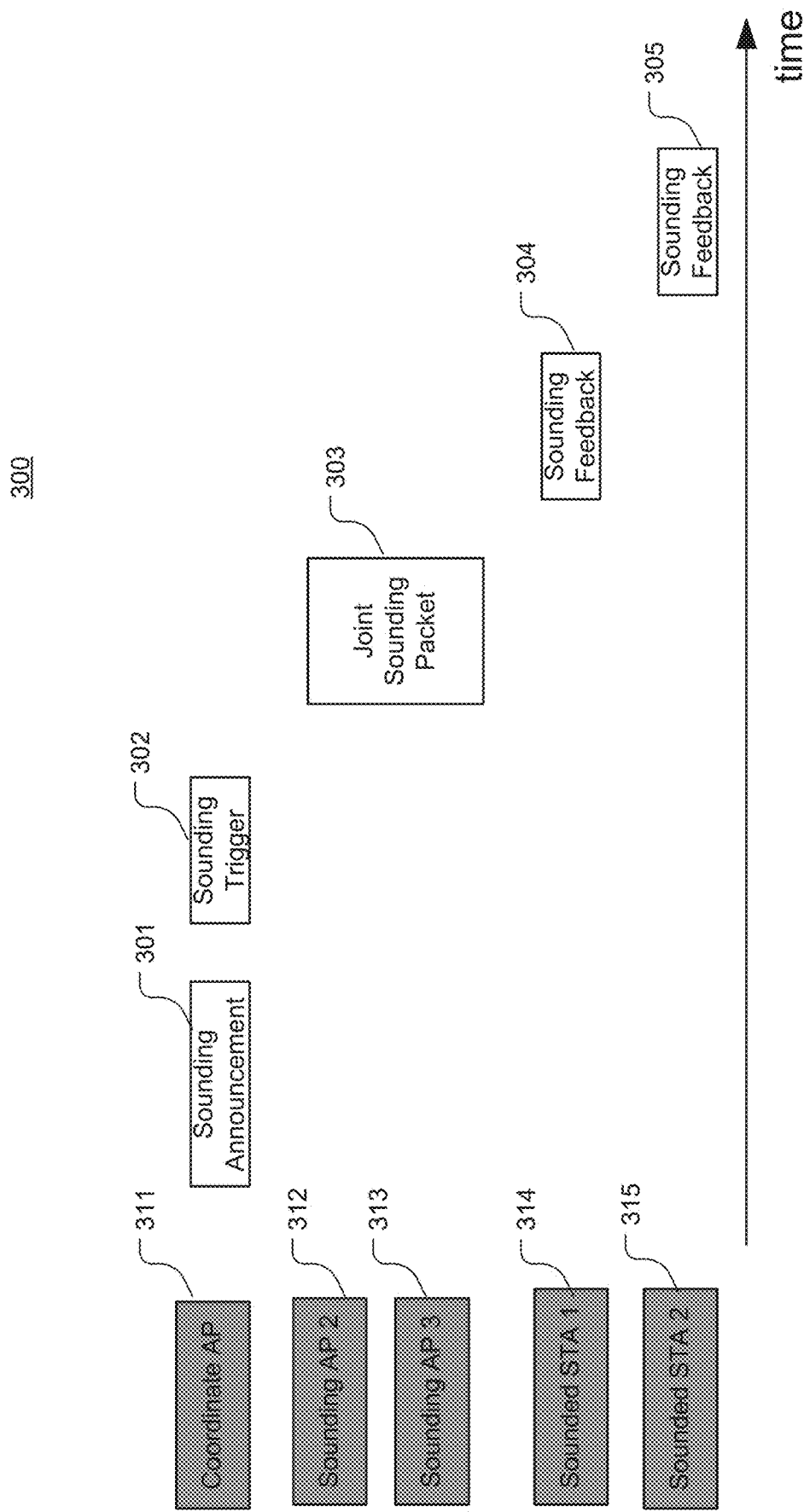
FIG. 3 illustrates an exemplary message exchange sequence among the wireless communication devices for joint transmission sounding in a WLAN in accordance with an embodiment of the present disclosure.

FIG. 3 illustrates an exemplary message exchange sequence among the wireless communication devices for joint transmission sounding in a WLAN in accordance with an embodiment of the present disclosure. In this example, AP 311 acts as the coordinating AP, and AP2 and AP3 312~313 are configured for joint sounding and joint data transmission with STA1 and STA2 314~315. As shown, the coordinating AP first transmits a sounding announcement frame 301 and a sounding trigger frame 302 directed to the sounding APs, AP2 and AP3. In response, AP2 and AP3 simultaneously transmit a joint sounding packet to STA1 and STA2, which is a null data packet including training fields associated with the antennas of both AP2 and AP3, as described in greater detail below. The sounded STA1 and STA2 may analyze the OFDM training fields to calculate the channel response, and produce the steering matrix representing the CSI. The matrix is supplied to AP2 and AP3 in sounding feedback frames 304 and 305.

Figure 4:
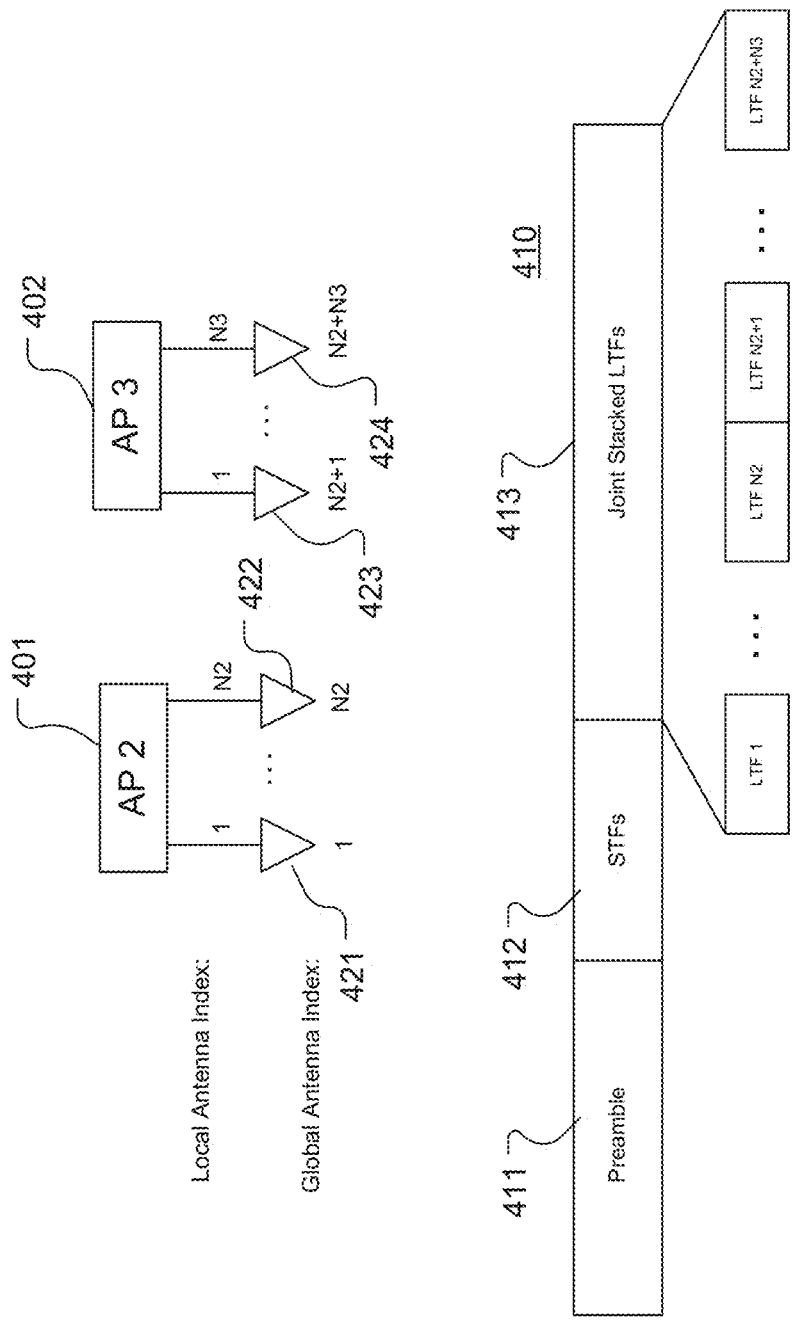
FIG. 4 illustrates the configuration of an exemplary joint sounding packet including training fields for antennas with global indexing in accordance with an embodiment of the present disclosure.

In some embodiments, the antennas of all the sounding APs are treated as a single virtual antenna array, and each antenna is assigned with a different global index. The joint sounding packet associates the training fields with the antennas by using the global antenna indexing. FIG. 4 illustrates the configuration of an exemplary joint sounding packet 410 including training fields for antennas with global indexing in accordance with an embodiment of the present disclosure. In this example, AP2 has N2 antennas (e.g., 421 and 422) with their local indices being 1~N2; and AP3 has N3 antennas (e.g., 423 and 424) with their local indices being 1~N3. In configuring the joint sounding packet, the antennas of the two APs are treated as a combined array and assigned with global indices 1~(N2+N3).

The joint sounding packet includes a preamble 411 and short training fields 412, and joint stacked long training fields (LTFs) 413. Each sounding AP sends the LTFs regarding its own antennas as a subset of all antennas from all the sounding APs. The LTFs from different APs stack together as a sequence in the packet. Thus, the joint stacked LTFs have a total number of (N2+N3) LTFs or more, namely LTF1, . . . , LTF N2, LTF N2+1, . . . , LTF N2+N3 as shown. In this instance, AP2 transmits the first N2 LTFs, and AP3 transmits the next N3 LTFs. However, it will be appreciated that the LTFs can be transmitted in any suitable order without departing from the scope of the present disclosure. Further, the global indices of the virtual antenna array may be contained in the sounding announcement frame or the sounding trigger frame. The duration of a respective LTF may be variable with the subcarrier spacing(s). For example, the duration can be reduced by changing the subcarrier spacing(s).

Figure 5:
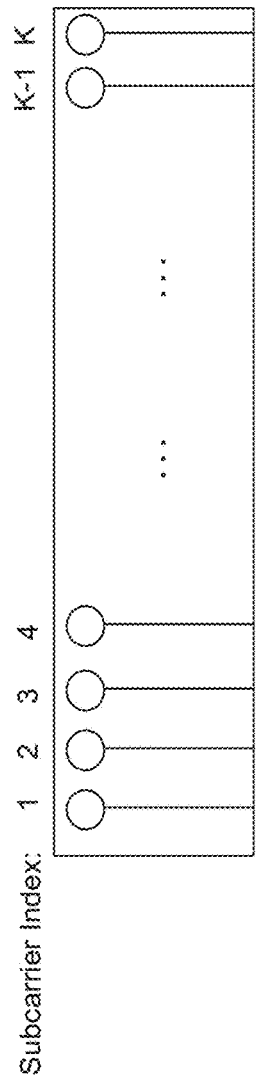
FIG. 5 illustrates an exemplary LTF in a joint sounding packet and a P matrix in accordance with an embodiment of the present disclosure.

In some embodiments, each non-pilot subcarrier in the joint stacked LTFs is encoded by applying a P matrix with the order of (N2+N3) and is transmitted by every sounding AP. That is, the P matrix has a dimension of (N2+N3)×(N2+N3). The P matrix can be a Hadamard matrix, any other predefined invertible matrix that is well known in the art, or the like. FIG. 5 illustrates an exemplary LTF in a joint sounding packet and a P matrix in accordance with an embodiment of the present disclosure. The LTF #n has K subcarriers with indices 1~K. All the sounding APs transmit the training signals on every non-pilot subcarrier. The frequency subchannels for each sub-carrier may be coded by the P matrix.

As shown in the matrix, the transmission antennas are indexed by the global indices, #1~#(N2+N3), and the LTFs are similarly indexed with the global indices of the antennas, #1~#(N2+N3). It will be appreciated that at each sounding AP, only a portion of the P matrix are applied. For example, for AP2 with antennas #1~#N2, only the first N2 rows of P matrix are used.

Figure 6:
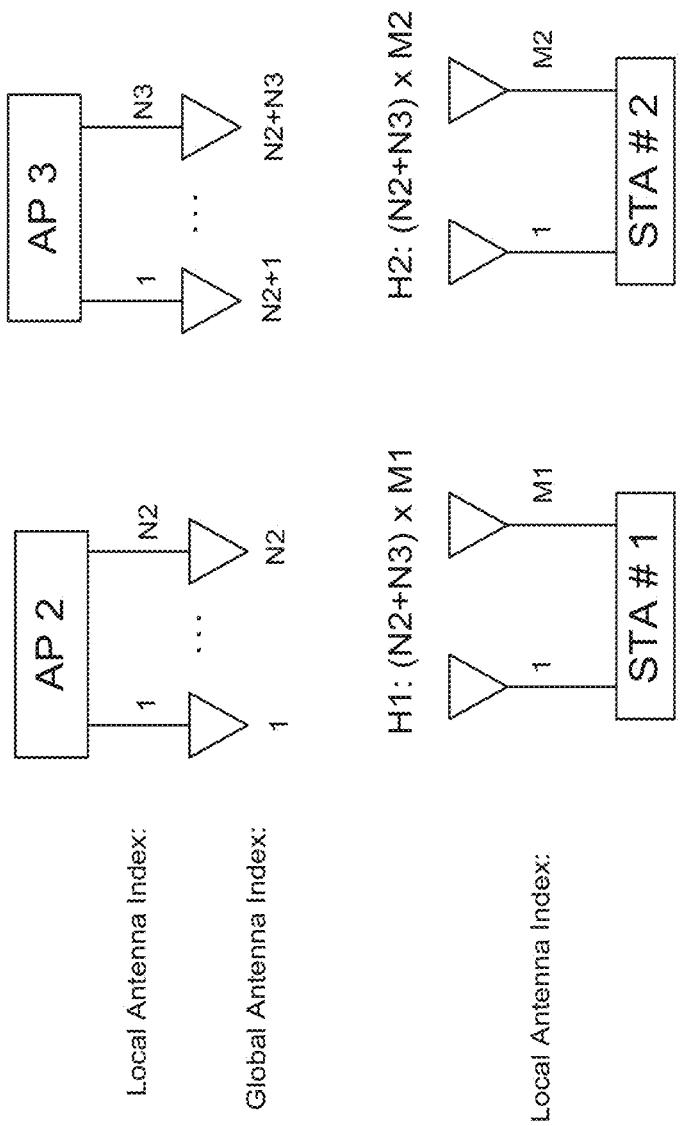
FIG. 6 illustrates exemplary channel estimation matrices performed by the antennas of the sounded STAs based on a joint sounding packet having joint stacked training fields in accordance with an embodiment of the present disclosure.

With global antenna indexing and joint stacked training fields, each sounded STA can estimate the channels between all the sounding APs and itself. FIG. 6 illustrates exemplary channel estimation matrices performed by the antennas of the sounded STAs based on a joint sounding packet having joint stacked training fields in accordance with an embodiment of the present disclosure. In the illustrated example, for the sounded STA #2 with M2 antennas, the estimated channel matrix is H2, which is an (N2+N3)×M2 matrix for each subcarrier. By the same token, for the sounded STA #1 with M1 antennas, the estimated channel matrix is H1, which is an (N2+N3)×M1 matrix for each subcarrier.

Generally, for the sounded STA k, assuming the received signal is y(k), the estimated channel Hk can be estimated by $$Hk=P^{-1}(1:Mk;)[y_{LTF1}(k), y_{LTF2}(k), \ldots, y_{LTF(N2+N3)}(k)]$$

The channel Hk or the compressed version of Hk is fed back to the sounding APs, e.g., using sequential feedback frames.

Figure 7:
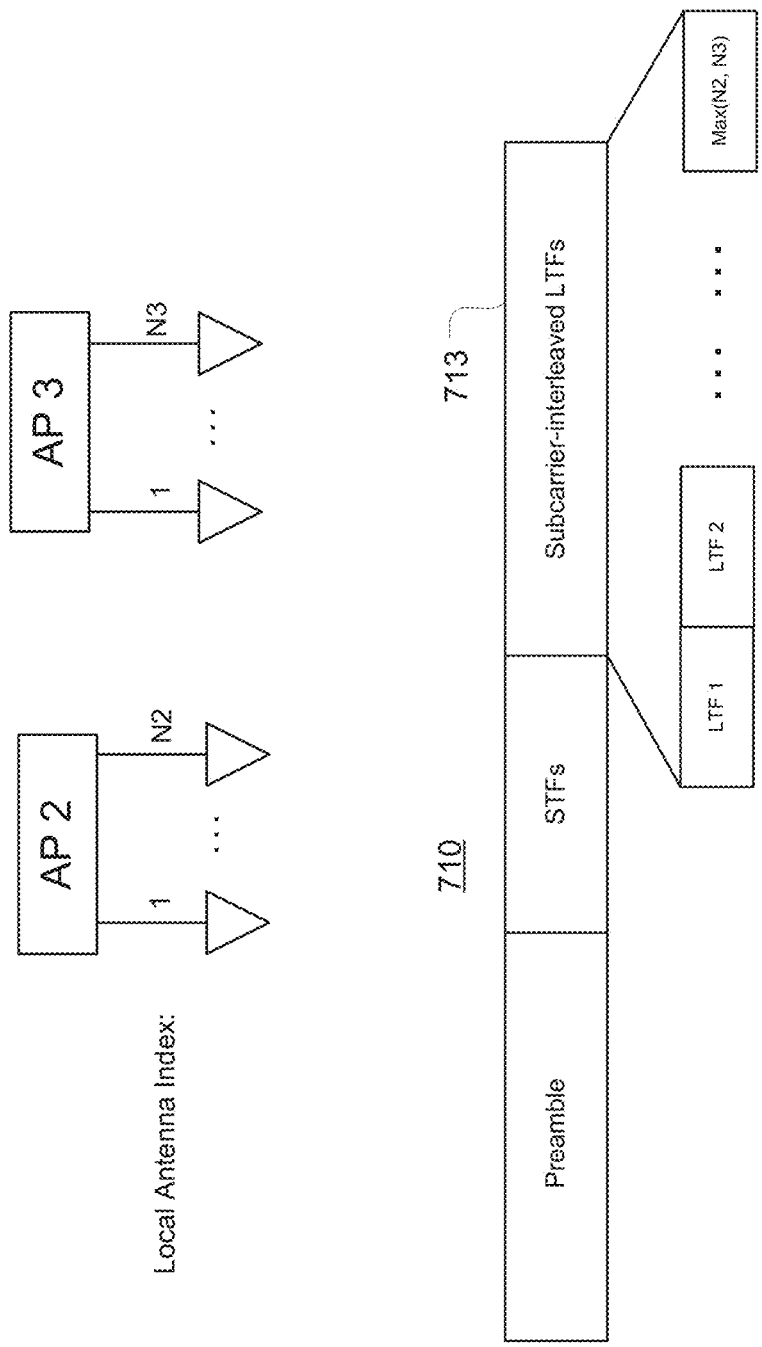
FIG. 7 illustrates the configuration of an exemplary joint sounding packet including subcarrier-interleaved LTFs in accordance with an embodiment of the present disclosure.

In some other embodiments, the sounding APs simultaneously or synchronously transmit a joint sounding packet which includes subcarrier-interleaved LTFs, and each sounding AP transmits LTFs on its allocated subcarriers. In this manner, the total number of LTFs may only need to be equal to or greater than the maximum number of antennas in an individual sounding AP among all the sounding APs. FIG. 7 illustrates the configuration of an exemplary joint sounding packet 710 including subcarrier-interleaved LTFs in accordance with an embodiment of the present disclosure. The antennas of the sounding AP2 and AP3 can be referred by their local antenna indices within their corresponding APs, e.g., 1~N2 and 1~N3, respectively. Each sounding AP transmits LTF signals only on their allocated non-pilot subcarriers. In some embodiments, in the joint sounding packet 710, the total number of LTFs with the training signals is equal to or greater than the maximum of N2 and N3, or MAX (N2, N3). The duration of a respective LTF may be variable with the subcarrier spacing(s). For example, the duration can be reduced by reducing the subcarrier spacing(s).

Figure 8:
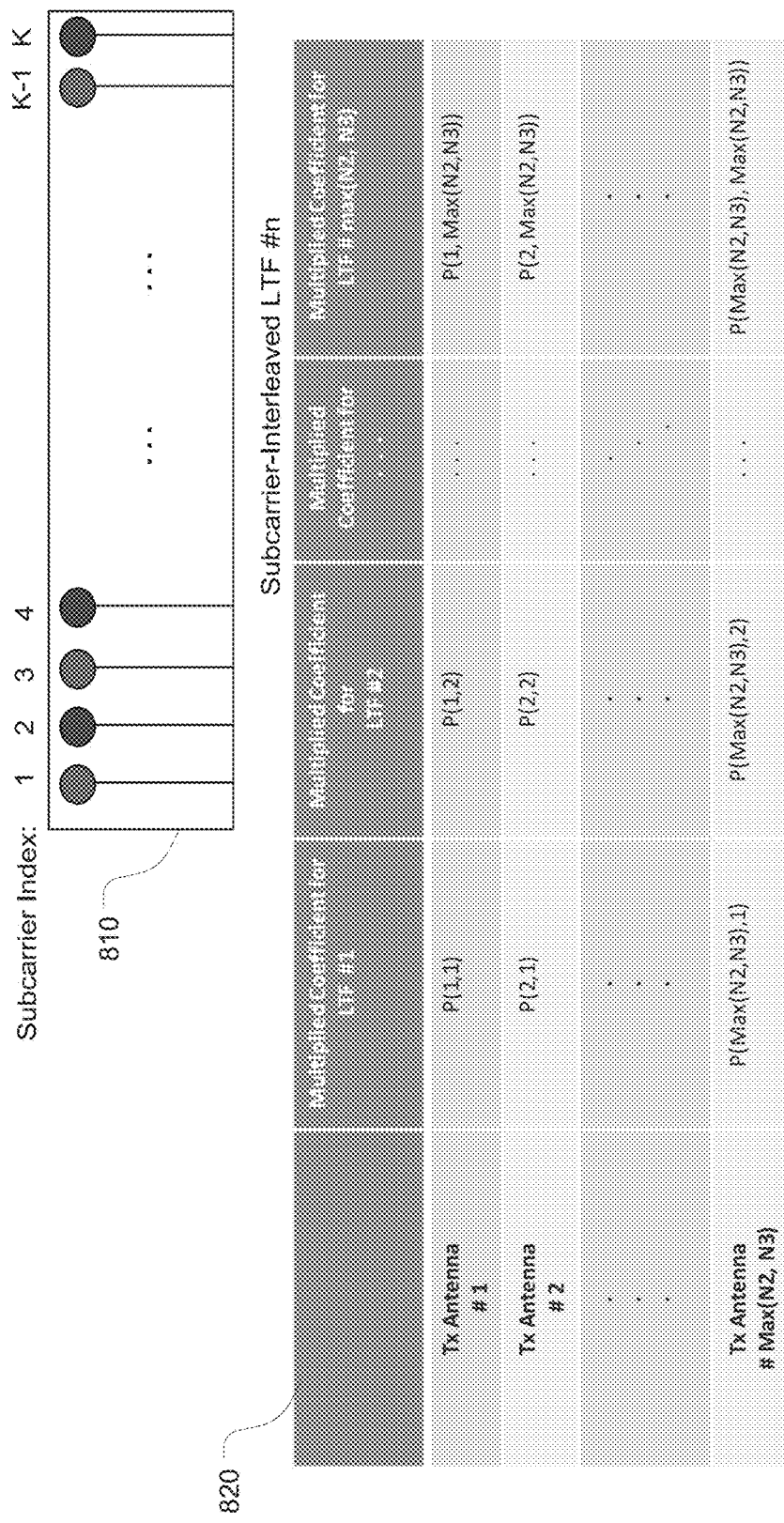
FIG. 8 illustrates the P matrix and tone allocation among the sounding APs in an exemplary joint sounding packet with subcarrier-interleaved LTFs in accordance with an embodiment of the present disclosure.

FIG. 8 illustrates the P matrix and tone allocation among the sounding APs in an exemplary joint sounding packet with subcarrier-interleaved LTFs in accordance with an embodiment of the present disclosure. Non-pilot subcarriers of each LTF are allocated among the sounding APs such that each non-pilot is only allocated to one AP. The transmit signals are multiplied by a P matrix in the order of MAX (N2, N3) and so having the dimension of MAX(N2, N3)× MAX(N2, N3). The P matrix can be a Hadamard matrix or any other suitable predefined invertible matrix or the like. In the illustrated example that has two sounding APs, the LTF #n 810 has the odd-indexed subcarriers 1, 3, 5 . . . and K–1 allocated to one AP, and has the even-indexed subcarriers 2, 4, 5, K allocated to the other sounding AP.

Figure 9:
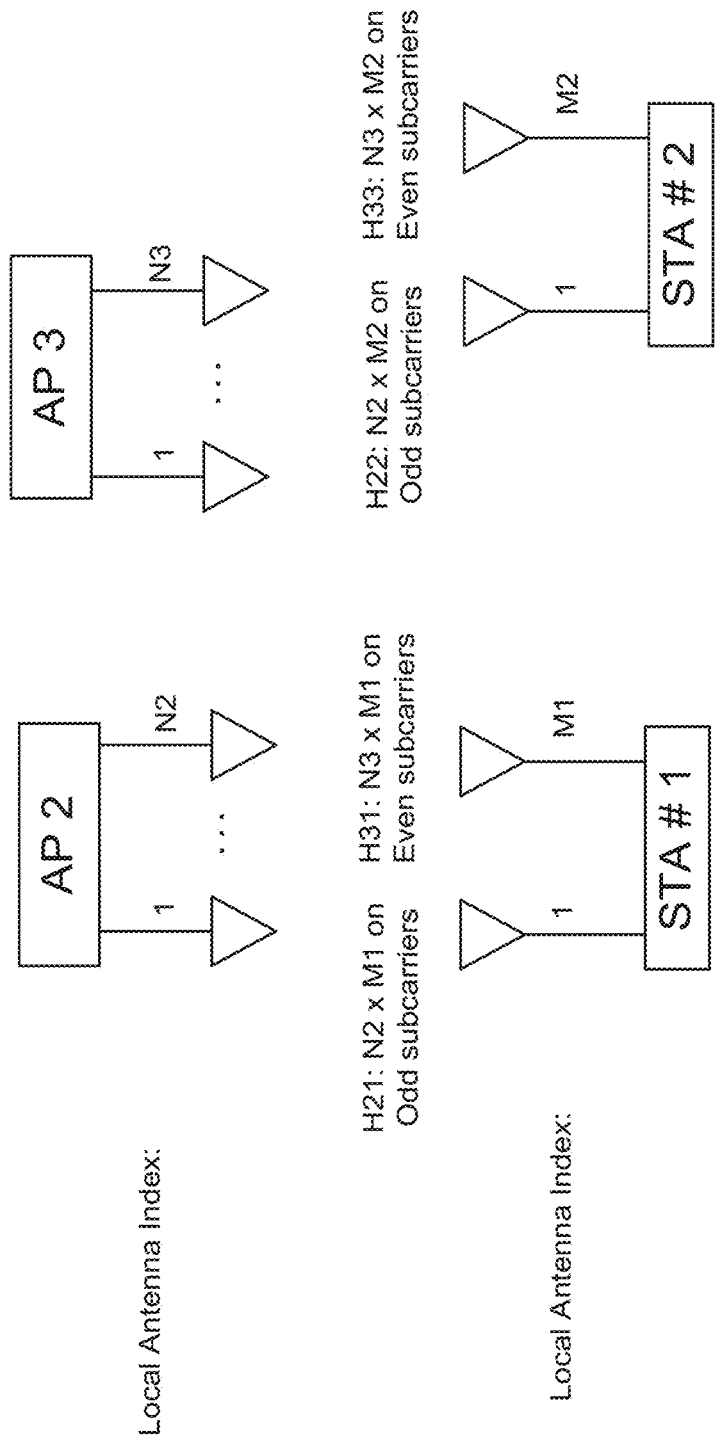
FIG. 9 illustrates exemplary channel estimation matrices by the antennas of the sounded STAs based on a joint sounding packet having subcarrier-interleaved training fields in accordance with an embodiment of the present disclosure.

The P matrix 820 is applied to the transmitted LTFs and has the dimension of MAX(N2, N3)×MAX(N2, N3). Thus, compared to the embodiment shown in FIGS. 4-6, the joint sounding packet has a reduced number of LTFs and the P matrix 820 has a reduced size. This can reduce carrier frequency offset (CFO) estimation and correction. FIG. 9 illustrates exemplary channel estimation matrices by the antennas of the sounded STAs based on a joint sounding packet having subcarrier-interleaved training fields in accordance with an embodiment of the present disclosure. For joint sounding using subcarrier-interleaved LTFs, each sounded STA can estimate the channels between all the sounding APs and itself only on the allocated subcarriers.

In the illustrated example, the sounded STA #1 and STA #2 have M1 and M2 (number of) antennas, respectively. For STA #2 for example, the estimated channel matrix is H2, which is an (N2+N3)×M2 matrix of each subcarrier. For antenna 1, the vector H22 in the matrix of H2 corresponds to N2×M2 elements on odd subcarriers, and the vector H33 corresponds to N3×M2 elements on even subcarriers. The channels on orthogonal subcarriers are interpolated from estimated channels on occupied subcarriers. For example, the channels between AP2 and STA #1 for even subcarriers can be generated from H21 on subcarriers via interpolation.

After the multi-AP joint sounding, one of the sounding APs needs to have information of all the channels between the sounding APs and all the sounded STAs. For each subcarrier, the channels can be stacked into one matrix H as $$H = \begin{bmatrix} H1 \\ H2 \\ \vdots \\ HK \end{bmatrix}$$

The beam-formed matrix and pre-coded MU-MIMO matrix Q can be calculated from H as $$Q = \begin{bmatrix} Q1 \\ Q2 \\ \vdots \\ QK \end{bmatrix}$$

Figure 10:
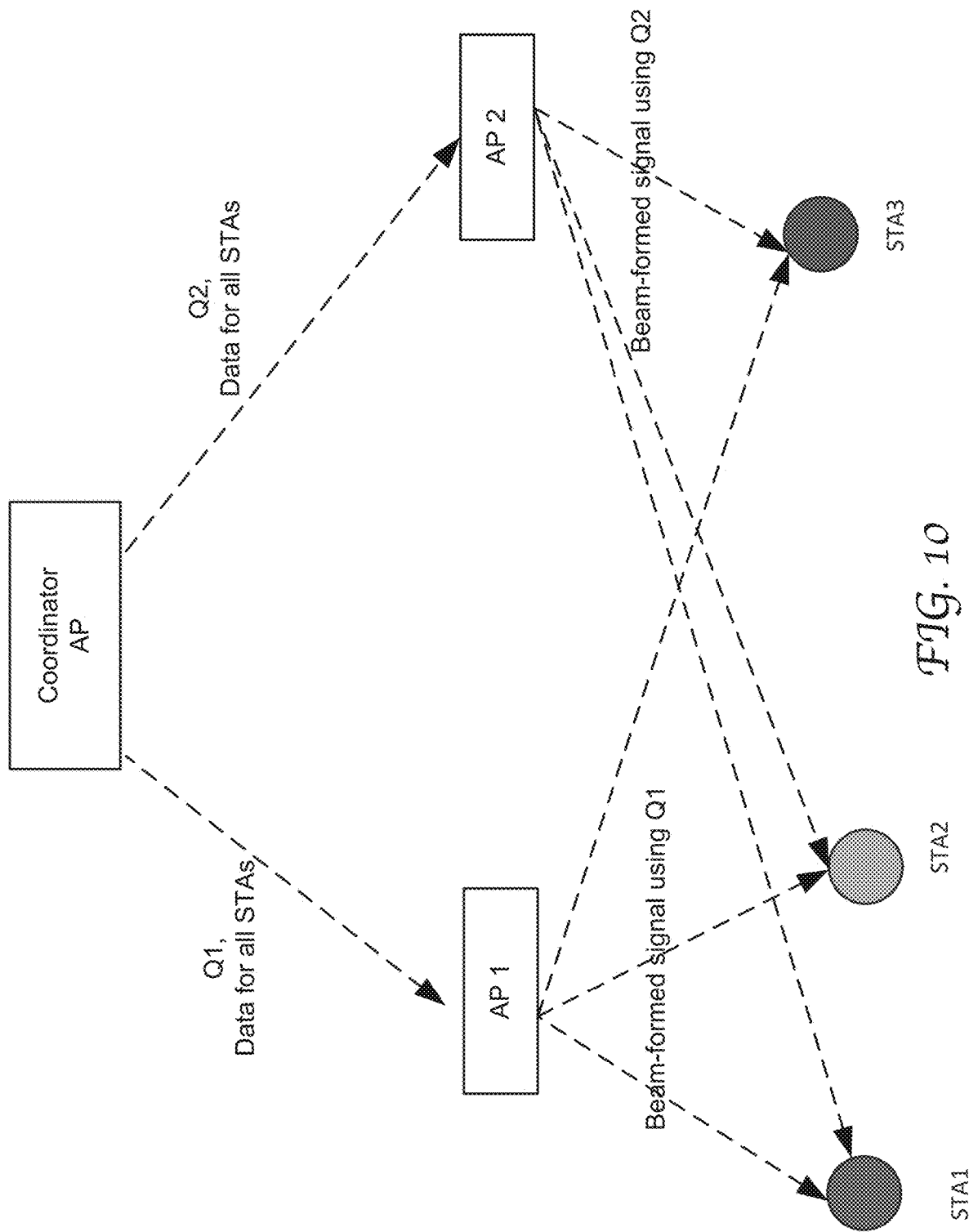
FIG. 10 illustrates an exemplary WLAN system with data for all target STAs and the partial of the calculated beam-formed or precoded matrix sent to each AP for joint transmission in accordance with an embodiment of the present disclosure.

Data for all target STAs and the partial of the calculated beam-formed or pre-coded matrix are sent to each AP for joint transmission. FIG. 10 illustrates an exemplary WLAN system with data for all target STAs and the partial of the calculated beam-formed or precoded matrix sent to each AP for joint transmission in accordance with an embodiment of the present disclosure. As illustrated, each AP transmits beam-formed signal using Q1 to all the STAs. The data can be modulated signals for each subcarrier. If the data is not modulated, modulation and coding schemes need to be signaled. Beamforming or precoding is then applied at each AP. This process can greatly reduce the amount of signals need to be distributed.

Figure 11:
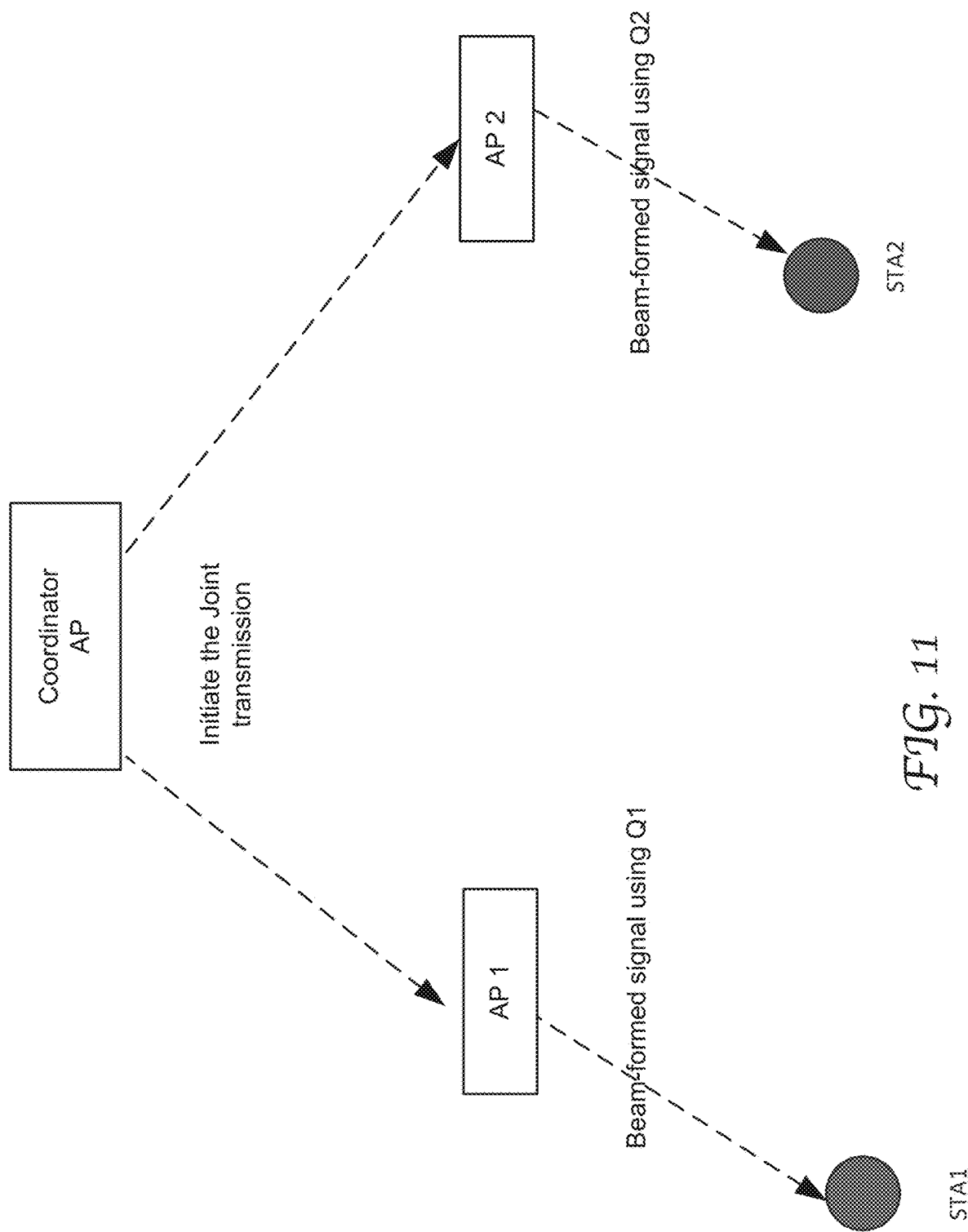
FIG. 11 illustrates an exemplary WLAN system with a calculated beam-formed or precoded matrix sent from an STA to a corresponding AP for joint transmission in accordance with an embodiment of the present disclosure.

When data for an STA is only available at one AP, the STA need only feed back the estimated channel to the target AP. For example, AP #d only has data of STA #k, then STA #k only needs to feed back channel Hk(1:Mk, 1:Nd) to AP #d. Each AP calculates the beamforming matrix Qk based on Hk(1:Mk, 1:Nd) for the STA #k. FIG. 11 illustrates an exemplary WLAN system with a calculated beam-formed or precoded matrix sent from an STA to a corresponding AP for joint transmission in accordance with an embodiment of the present disclosure. As shown, AP1 only has the data for STA1 and AP2 only has the data for STA2. Each AP executes independent beamforming, and the two APs jointly transmit data through a single data packet. Therefore, AP1 calculates the beamforming matrix Q1 based on the channel between AP1 and STA1; and AP2 calculates beamforming matrix Q2 based on the channel between AP2 and STA2.

Embodiments of the present disclosure are described in detail with reference to a system with two sounding APs. Both the schemes of using joint stacked LTFs and using subcarrier-interleaved LTFs can be generalized to systems with any number of sounding APs, e.g., including all the APs to be used in a transmission opportunity (TXOP). For the scheme of using joint stacked LTFs, the generalization can be achieved by direct global indexing of the antennas of all the sounding APs of the TXOP and making the number of joint stacked LTF equal to greater than the total number of all the antennas. For the scheme using subcarrier-interleaved LTFs, the generalization can be achieved by directly allocating the subcarriers among all the sounding APs of the TXOP and making the number of subcarrier-interleaved LTFs as the maximum number of antennas equipped by the sounding APs.

In some embodiment, the mechanisms of joint stacked LTFs and subcarrier-interleaved LTFs can be used in a hybrid manner in a TXOP. Particularly, sounding APs can be grouped into two groups, one group uses joint stacked LTFs in a joint sounding packet, and the other group uses subcarrier-interleaved LTFs in another joint sounding packet. This hybrid approach can reduce the total number of LTFs that need to be transmitted and enhance the sounding quality.

Figure 12:
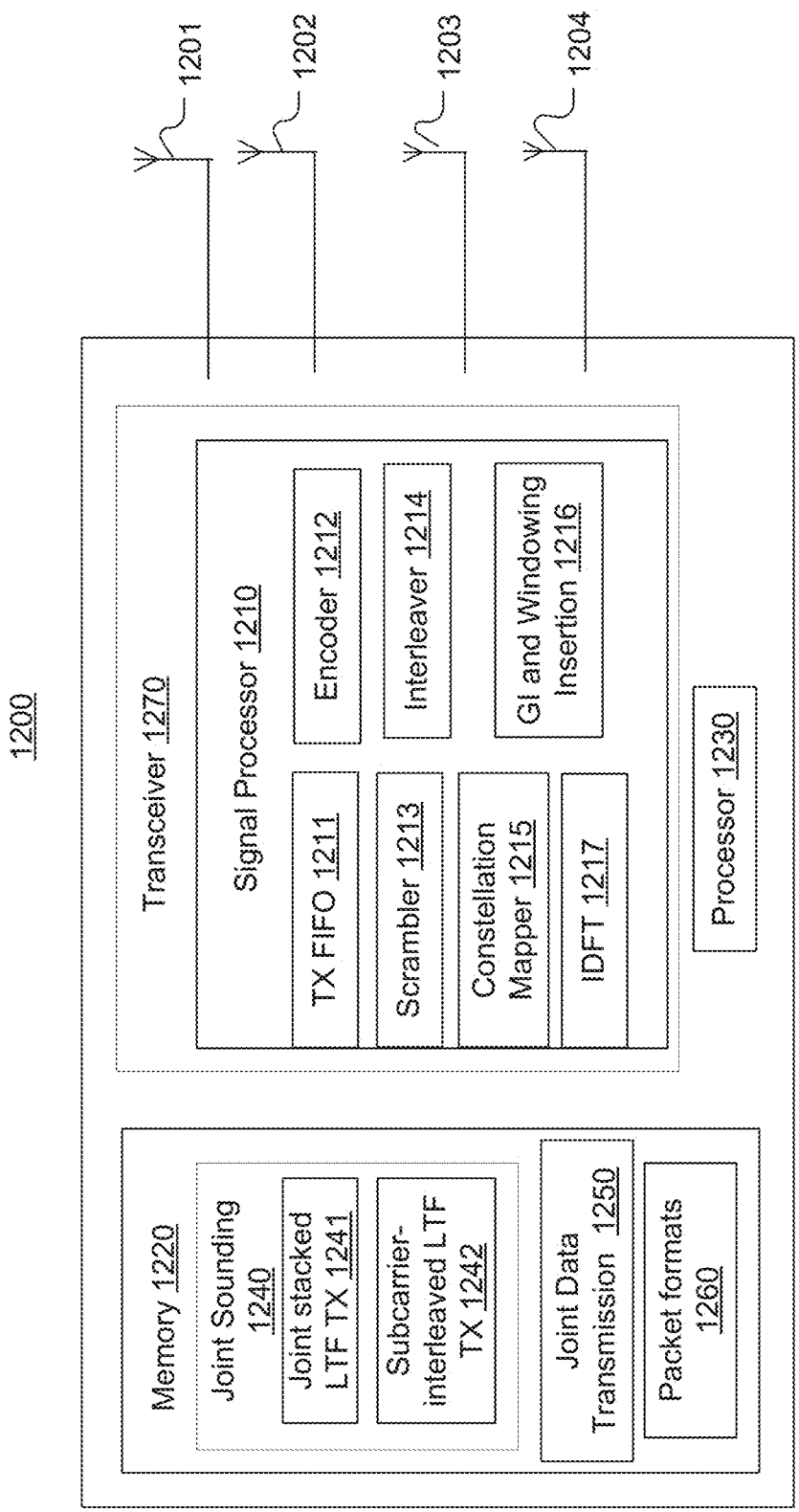
FIG. 12 is a block diagram illustrating an exemplary wireless communication device capable of joint sounding and joint data transmission with other APs in accordance with an embodiment of the present disclosure.

FIG. 12 is a block diagram illustrating an exemplary wireless communication device 1200 capable of joint sounding and joint data transmission with other APs in accordance with an embodiment of the present disclosure. The communication device 1200 can be configured as one of a coordinated AP in a multi-AP system and has a transceiver configured for data communication, e.g., a general purpose computer, a smart phone, a tablet wearable device, a sensor used on Internet of Things (IoT), and etc.

The memory 1220 stores the joint sounding module 1240, the joint data transmission module 1250 and packet formats module 1260. The packet format module 1260 stores the formats and field definitions of various types of frames that can be transmitted from or received by the AP in compliance with one or more communication protocols, including joint data packet, joint sounding packet, sounding announcement frame, sounding trigger frame, and null data packet, and etc. Particularly, the packet format module 1260 stores the formats of joint sounding packet with joint stacked LTFs and/or subcarrier-interleaved LTFs, as described in greater detail above.

The joint sounding module 1240 includes a TX module 1241 for joint stacked LTFs and a TX module 1242 for subcarrier-interleaved LTFs. The module 1241 may perform global indexing of the antennas of the sounding APs, calculating a P matrix, and determining the training signals of various subcarriers and arrangements of the stacked LTFs in a joint sounding packet. The module 1242 may perform local indexing of the antennas of the sounding APs, calculating a P matrix, allocating subcarrier tones to the sounding APs, and determining the training signals of various subcarriers and arrangements of the subcarrier-interleaved LTFs in a joint sounding packet.

The joint data transmission module 1250 may be configured to implement the algorithms used in joint beamforming or precoding based on CSI feedback information, such as calculating a beamforming matrix and/or a precoding matrix.

The transceiver 1270 includes a signal processor 1260 having various modules of the transmit path which is configured to generate beacon frames, association response frames, data frames or any other type of communication information units. For instance, the signal processor 1210 includes a transmit First-In-First-Out (TX FIFO) 1211, an encoder 1212, a scrambler 1213, an interleaver 1214, a constellation mapper 1215, an inversed discrete Fourier transformer (IDFT) 1217, and a guard interval (GI) and windowing insertion module 1216. The signal processor 1210 also includes a receive path. Detailed illustration and description of the receive path in device 1200 are omitted for brevity.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of wireless communication in a wireless local area network, the method comprising:
    at a first access point (AP), receiving a sounding synchronization indication that is transmitted from a coordinating AP and directed to multiple APs comprising said first AP and a second set of APs;
    responsive to said sounding synchronization indication, said first AP transmitting a joint sounding packet in synchronization with said second set of APs transmitting said joint sounding packet, wherein said joint sounding packet comprises training fields in a first channel for antennas of both said first AP and said second set of APs, wherein said second set of APs comprises one or more APs;
    said first AP receiving first channel status information regarding said first channel from multiple stations (STAs) in said WLAN, wherein said first channel status information is generated by said multiple STAs based on said joint sounding packet; and
    based on said channel status information and in a joint transmission opportunity (TXOP), said first AP and said second AP jointly transmitting a first data packet to said multiple STAs on said first channel during said joint TXOP.

2. The method of claim 1, wherein said first AP comprises a first number of antennas, and said second set of APs comprises a second number of antennas, and wherein further first channel status information is generated from channel estimation regarding said first number of antennas.

3. The method of claim 1, wherein said first AP comprises a first number of antennas, and said second set of APs in combination comprises a second number of antennas, and wherein said joint sounding packet comprises a third number of long training fields (LTFs) that is greater than or equal to said first number plus said second number.

4. The method of claim 3, wherein each LTF of said third number of LTFs comprises training symbols of a set of non-pilot subcarriers, and wherein, during transmitting said joint sounding packet, said first AP transmits training symbols on each subcarrier in said LTF.

5. The method of claim 4, wherein each non-pilot subcarrier in said third number of LTFs is coded according to a Hadamard matrix having an order equal to said third number.

6. The method of claim 1, wherein said sounding synchronization indication is comprised in a sounding announcement frame or a sounding trigger frame.

7. The method of claim 3, wherein each antenna of said multiple APs is associated with a different global antenna index, and wherein each LTF in said joint sounding packet is associated with a global antenna index.

8. The method of claim 1, wherein said first AP comprises a first number of antennas, and said second AP comprises a second number of antennas, and wherein said joint sounding packet comprises a third number of long training fields (LTFs) that is greater than or equal to a larger said first number plus said second number.

9. The method of claim 1, wherein said joint sounding packet comprises a fourth number of long training fields (LTFs) that is greater than or equal to a maximum number of antennas in an individual AP among said multiple APs, wherein each LTF of said fourth number of LTFs comprises training symbols of a set of non-pilot subcarriers, and wherein further, during transmitting said joint sounding packet, each of said multiple AP transmits training symbols on a respective subset of non-pilot subcarriers in said LTF.

10. The method of claim 1, wherein said multiple APs further comprise a third set of APs, and further comprising said third set of APs transmitting another joint sounding packet to said multiple STAs in synchronization with said first AP transmitting said joint sounding packet, wherein said joint sounding packet comprises a fifth number of LTFs that is equal to or greater than a total number of antennas of said first AP and said second set of APs, and wherein, during transmitting said joint sounding packet, each AP of said first AP and said second set of APs transmits training symbols on each subcarrier in each LTF of said fifth number of LTFs, said another joint sounding packet comprises a sixth number of long training fields (LTFs) that is greater than or equal to a maximum number of antennas in an individual AP among said third set of APs, and wherein further, during transmitting said another joint sounding packet, each of said third set of AP transmits training symbols on a respective subset of non-pilot subcarriers in each LTF of said sixth number of LTFs.

11. The method of claim 5, wherein a duration of an LTF in third number of LTFs is variable with a subcarrier spacing in said LTF.

12. A wireless communication device configured as a first access point in a WLAN, said device comprising:
   a memory;
   a processor coupled to said memory; and
   a transceiver coupled to said processor, wherein said transceiver is configured to: receive a sounding synchronization indication that is transmitted from a
   coordinating AP and simultaneously directed to multiple APs comprising
   said first AP and a second set of APs;
      responsive to said sounding synchronization indication, transmit a joint sounding packet in synchronization with said second set of APs transmitting said joint sounding packet, wherein said joint sounding packet comprises training fields in a first channel for antennas of both said first AP and said second set of APs, wherein said second set of APs comprises one or more APs;
      receive first channel status information regarding said first channel from multiple stations (STAs) in said WLAN, wherein said first channel status information is generated by said multiple STAs based on said joint sounding packet; and
      based on said channel status information and in a joint transmission opportunity (TXOP), jointly transmit a first data packet to said multiple STAs on said first channel with said second set of APs transmitting said first data packet to said multiple STAs on said first channel during said joint TXOP.

13. The wireless communication device of claim 12 further comprising a first number of antennas, wherein said second set of APs comprises a second number of antennas, and wherein further first channel status information is generated from channel estimation regarding said first number of antennas.

14. The wireless communication device of claim 12 further comprising a first number of antennas, and said second set of APs in combination comprises a second number of antennas, and wherein said joint sounding packet comprises a third number of long training fields (LTFs) that is greater than or equal to said first number plus said second number.

15. The wireless communication device of claim 14, wherein each LTF of said third number of LTFs comprises training symbols of a set of non-pilot subcarriers, and wherein said transceiver is further configured to transmit training symbols on each subcarrier in said LTF during transmitting said joint sounding packet.

16. The wireless communication device of claim 14, wherein each non-pilot subcarrier in said third number of LTFs is coded according to a Hadamard matrix having an order equal to said third number.

17. The wireless communication device of claim 14, wherein said sounding synchronization indication is comprised in a sounding announcement frame or a sounding trigger frame(Original) The wireless communication device of claim 14, wherein each antenna of said multiple APs is associated with a different global antenna index, and wherein each LTF in said joint sounding packet is associated with a global antennal index.

18. The wireless communication device of claim 12 further comprising a first number of antennas, and said second AP comprises a second number of antennas, and wherein said joint sounding packet comprises a third number of long training fields (LTFs) that is greater than or equal to a larger said first number plus said second number.

19. The wireless communication device of claim 12, wherein said joint sounding packet comprises a fourth number of long training fields (LTFs) that is greater than or equal to a maximum number of antennas in an individual AP among said multiple APs, wherein each LTF of said fourth number of LTFs comprises training symbols of a set of non-pilot subcarriers, and wherein further, during transmitting said joint sounding packet, each of said multiple AP transmits training symbols on a respective subset of non-pilot subcarriers in said LTF.

20. The wireless communication device of claim 12, wherein said multiple APs further comprise a third set of APs, and wherein said transceiver is configure to transmitting said joint sounding packet in synchronization with said third set of APs transmitting another joint sounding packet to said multiple STAs, wherein said joint sounding packet comprises a fifth number of LTFs that is equal to or greater than a total number of antennas of said first AP and said second set of APs, and wherein, during transmitting said joint sounding packet, each AP of said first AP and said second set of APs transmits training symbols on each subcarrier in each LTF of said fifth number of LTFs, wherein said another joint sounding packet comprises a sixth number of long training fields (LTFs) that is greater than or equal to a maximum number of antennas in an individual AP among said third set of APs, and wherein further, during transmitting said another joint sounding packet, each of said third set of AP transmits training symbols on a respective subset of non-pilot subcarriers in each LTF of said sixth number of LTFs.

21. The wireless communication device of claim 16, wherein a duration of an LTF in said third number of LTFs is variable with a subcarrier spacing in said LTF.

* * * * *